United States Patent [19]

Ishii et al.

[11] Patent Number: 5,250,593

[45] Date of Patent: Oct. 5, 1993

[54] STABILIZED POLYOLEFIN COMPOSITION

[75] Inventors: Tamaki Ishii, Suita; Shinichi Yachigo, Toyonaka; Fumitoshi Kojima, Ibaraki; Kanako Ida, Ashiya, all of Japan

[73] Assignee: Sumitomo Chemical Company, Limited, Osaka, Japan

[21] Appl. No.: 940,375

[22] Filed: Sep. 3, 1992

[30] Foreign Application Priority Data

Sep. 3, 1991 [JP] Japan ................... 3-222727

[51] Int. Cl.$^5$ .............. C08K 5/5393; C08K 5/527; C08K 5/526; C08K 5/51
[52] U.S. Cl. ................... 524/100; 524/108; 524/117; 524/149; 524/291; 524/126
[58] Field of Search ............ 524/126, 100, 117, 108, 524/149, 291

[56] References Cited

U.S. PATENT DOCUMENTS

| | | | |
|---|---|---|---|
| 4,168,387 | 9/1979 | Cottman | 524/291 |
| 4,233,412 | 11/1980 | Rody et al. | 525/440 |
| 4,365,032 | 12/1982 | Yosizato et al. | 524/291 |
| 4,525,514 | 6/1985 | Yachigo et al. | 524/291 |
| 4,576,734 | 3/1986 | Ishii et al. | 524/108 |
| 4,719,257 | 1/1988 | Ishii et al. | 524/108 |
| 4,721,744 | 1/1988 | Ishii et al. | 524/102 |
| 4,829,112 | 5/1989 | Ishii et al. | 524/108 |
| 4,912,155 | 3/1990 | Burton | 524/149 |
| 4,956,408 | 9/1990 | Mathis et al. | 524/147 |
| 5,128,398 | 7/1992 | Sasaki et al. | 524/291 |

FOREIGN PATENT DOCUMENTS

| | | |
|---|---|---|
| 0322166 | 6/1989 | European Pat. Off. |
| 0341925 | 11/1989 | European Pat. Off. |
| 0421932A1 | 4/1991 | European Pat. Off. |

*Primary Examiner*—Veronica P. Hoke
*Attorney, Agent, or Firm*—Wenderoth, Lind & Ponack

[57] ABSTRACT

A polyolefin composition comprising a polyolefin, and the following components:
(A) a phenolic compound which is a derivative of pentaerythritol,
(B) a phenolic acrylate compound,
(C) at least one organic phosphorous compound such as bis(2,6-di-t-butyl-4-methylphenyl) pentaerythritol diphosphite. This composition is stable against thermal processing, thermal oxidation and discoloration, and it is especially useful for fibers and films. Further incorporation of a polycondensate of dimethyl succinate with 1-(2-hydroxyethyl)-4-hydroxy-2,2,6,6-tetramethylpiperidine is effective to inrove the light stability of the composition.

17 Claims, No Drawings

STABILIZED POLYOLEFIN COMPOSITION

The present invention relates to a stabilized polyolefin composition, and more particularly it relates to a polyolefin composition which is not only stable against thermal deterioration at the high temperature processing and against thermal oxidative deterioration at the usage, but also extremely stable against discoloration to be caused by combustion gas or nitrogen oxides gas (hereinafter referred to as "NOx gas").

Since polyolefin resins, including polyethylene, polypropylene and the like, have excellent physical, chemical and electrical properties, they are widely used as materials for fibers, films, sheets and other shaped articles. However, these polyolefin resins have some problems in that they tend to be deteriorated by the action of heat at the processing and by the action of heat and oxygen at the usage, thereby degrading their mechanical properties.

In order to control such deterioration, various stabilizers, such as phenolic antioxidants and organic phosphorous antioxidants, have heretofore been used. For example, the phenolic antioxidants conventionally used include 2,6-di-t-butyl-4-methylphenol, 1,3,5-tris(3,5-di-t-butyl-4-hydroxybenzyl) isocyanurate, 1,3,5-tris(4-t-butyl-3-hydroxy-2,6-dimethybenzyl) isocyanurate, and the like. The organic phosphorous antioxidants conventionally used include distearyl pentaerythritol diphosphite, tris(2,4-di-t-butylphenyl) phosphite, bis(2,4-di-t-butylphenyl) pentaerythritol diphosphite, tetrakis(2,4-di-t-butylphenyl) 4,4'-biphenylene diphosphonite, and the like.

Polyolefin compositions conventionally proposed have showed some improvements in thermal oxidation resistance at the usage, but they have been still insufficient in heat resistance at the high temperature processing. Especially in a field of fibers, films or the like, where the polyolefin composition undergoes severe production conditions and usage conditions, there are still some problems, and the conventional technologies are not so practically satisfactory in such a field.

For example in a field of fibers, since the conditions of production and processing are severer than those in usual thick articles, the composition is necessary in the first place to endure the high temperature at the production process. In a drying step after the fiber formation, city gas or kerosene is often used as a heat source. Since the polyolefin fibers are easily discolored by the combustion gas from the heat source, they are also desired to endure such discoloration. Further, the final products of the fibers are also exposed to exhaust gas, such as combustion gas from fuel of automobiles in outdoor usage and combustion gas from a kerosene stove in interior usage. Since the polyolefin fibers tend to be discolored by NOx gas contained in the exhaust gas, they are also desired to endure such discoloration.

Though polyolefin compositions conventionally proposed are stable considerably agaist the thermal oxidation at the usage, they are not so satisfactory in heat resistance at the high temperature processing, and also they are not to be said to have sufficient stability against the discoloration caused by the combustion gas or NOx gas. Thus, it has been strongly desired to develop a stabilizer formulation which stabilizes the polyolefin against heat at the high temperature processing and thermal oxidation at the usage and also shows excellent resistance against the discoloration to be caused by the combustion gas or NOx gas.

As a result of intensive research to develope a polyolefin composition which has practically a sufficient stability against heat at the high temperature processing and against thermal oxidation at the usage and is also stable against discoloration to be caused by the combustion gas or NOx gas, it has been found that the combined use of a particular hindered phenolic compound, a particular acrylate compound and a particular organic phosphorous compound give quite excellent properties. It has also been found that the use of a particular hindered piperidine compound together with the above components further improves the stability against light, in addition to the stability against heat at the high temperature processing and against thermal oxidation at the usage as well as the excellent resistance against the discoloration to be caused by the combustion gas or NOx gas.

Thus, the present invention provides a polyolefin composition comprising a polyolefin and, per 100 parts by weight of the polyolefin, the following components:

(A) 0.01 to 1 part by weight of a hindered phenolic compound represented by the formula (I):

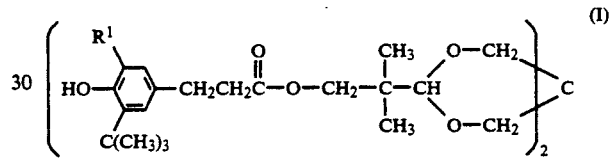

wherein $R^1$ is hydrogen or an alkyl of 1 to 3 carbon atoms;

(B) 0.01 to 1 part by weight of an acrylate compound represented by the formula (II):

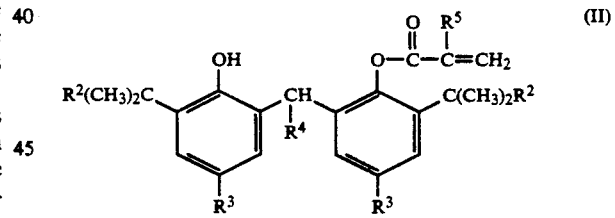

wherein $R^2$ is an alkyl of 1 to 5 carbon atoms, $R^3$ is an alkyl of 1 to 8 carbon atoms, $R^4$ is hydrogen or an alkyl of 1 to 8 carbon atoms, and $R^5$ is hydrogen or methyl; and (C) 0.01 to 1 part by weight of at least one organic phosphorous compound selected from
bis(2,6-di-t-butyl-4-methylphenyl) pentaerythritol diphosphite,
bis(2,4-di-t-butylphenyl) pentaerythritol diphosphite,
tris(2,4-di-t-butylphenyl) phosphite,
tetrakis(2,4-di-t-butylphenyl) 4,4'-biphenylene diphosphonite,
2,2'-ethylidenebis(4,6-di-t-butylphenyl) fluorophosphite, and
2,2'-methylenebis(4,6-di-t-butylphenyl) octyl phosphite.

The present invention also provides a polyolefin composition, in addition to the above-mentioned polyolefin and components (A), (B) and (C), further comprising (D) 0.01 to 1 part by weight, per 100 parts by weight of the polyolefin, of a hindered piperidine compound represented by the formula (III):

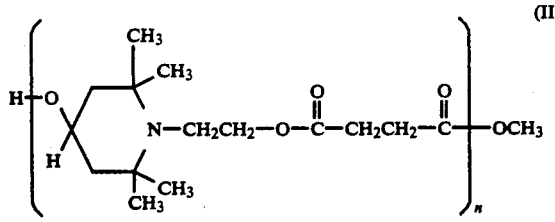

wherein n is 2 to 20.

The invention further provides a process for producing a polyolefin shaped article by blending a polyolefin with the aforementioned components (A), (B) and (C), or further with the component (D), and forming the resulting composition into a shaped article such as fiber or film, thereby stabilizing the shaped article against heat and oxidation as well as against discoloration by combustion gas or NOx gas. The invention still further provides a polyolefin fiber or film prepared from the aforementioned composition.

The polyolefin to be used in the invention is a homopolymer of an α-olefin including ethylene, propylene, butene-1, isobutene, 3-methylpentene-1, hexene-1, 4-methylpentene-1 or the like, or a random or block copolymer obtainable from two or more of the α-olefins. Specific examples thereof are polyethylene, polypropylene, polybutene-1, polyisobutene, poly-3-methylbutene-1, polyhexene-1, poly-4-methylpentene-1, ethylene/propylene copolymer, ethylene/butene-1 copolymer, ethylene/4-methylpentene-1 copolymer, propylene/butene-1 copolymer, propylene/4-methylpentene-1 copolymer, ethylene/propylene/butene-1 copolymer, and the like, among which especially preferred is polypropylene including a propylene homopolymer and a copolymer of propylene with a little amount of ethylene.

According to the invention, the polyolefin is blended with the hindered phenolic compound (A) represented by the above formula (I), the acrylate compound (B) represented by the above formula (II) and the aforementioned organic phosphorous compound (C).

In the hindered phenolic compound (A) represented by the formula (I), $R^1$ is hydrogen or an alkyl of 1 to 3 carbon atoms including methyl, ethyl and propyl, but $R^1$ is preferably the alkyl and most preferably methyl in view of the thermal oxidation resistance.

In the acrylate compound (B) represented by the formula (II), $R^2$ is an alkyl of 1 to 5 carbon atoms including methyl, ethyl, propyl, t-butyl, 2,2-dimethylpropyl and the like, but $R^2$ is preferably methyl or ethyl in view of the thermal stability. $R^3$ in the formula (II) is an alkyl of 1 to 8 carbon atoms including methyl, ethyl, propyl, t-butyl, t-pentyl, t-octyl and the like, but $R^3$ is preferably methyl, t-butyl or t-pentyl in view of the thermal stability, and especially preferred is t-pentyl. $R^4$ in the formula (II) is hydrogen or an alkyl of 1 to 8 carbon atoms including methyl, ethyl, propyl, butyl, pentyl, octyl and the like, but $R^4$ is preferably hydrogen or methyl in view of the thermal stability. $R^5$ in the formula (II) is hydrogen or methyl, among which hydrogen is preferred in view of the thermal stability.

The organic phosphorous compound (C) to be used in the invention is selected from the aforementioned six compounds, among which bis(2,6-di-t-butyl-4-methylphenyl) pentaerythritol diphosphite is especially preferred in view of the thermal and oxidation resistance.

In the invention, all of the compounds (A), (B) and (C) are essential components, and the amounts thereof to be used are respectively 0.01 to 1 part by weight for each compound per 100 parts by weight of the polyolefin. When any of the compounds (A), (B) and (C) is used in an amount less than 0.01 part by weight, the desired effects are insufficiently achieved, whereas when any of them is used in an amount exceeding 1 part by weight, proper improvements in the effects corresponding to the increased amount is hardly expected, and it is also uneconomical. Within these ranges, the hindered phenolic compound (A) is preferably used in an amount of from about 0.02 to about 0.5 part by weight, the acrylate compound (B) is used in an amount of from about 0.02 to about 0.5 part by weight, and the organic phosphorous compound (C) is used in an amount of from about 0.02 to about 0.5 part by weight, each per 100 parts by weight of the polyolefin.

In the invention, it is also preferred to use the component (D), i.e. the hindered piperidine compound represented by the formula (III), in combination with the compounds (A), (B) and (C). The combined use of the hindered piperidine compound contributes to further improve the stability against light, in addition to the stability against heat at the high temperature processing and against thermal oxidation at the usage as well as the excellent properties against discoloration to be caused by the combustion gas or NOx gas. The amount of the hindered piperidine compound represented by the formula (III), when used, is 0.01 to 1 part by weight, preferably from about 0.02 to about 0.5 part by weight, per 100 parts by weight of the polyolefin. The hindered piperidine compound represented by the formula (III) is disclosed, for example, as "TINUVIN 622 LD" from Ciba-Geigy Corp.

The polyolefin composition of the invention may further contain any other additives including antioxidants, light stabilizers, metal soaps, nucleating agents, lubricants, antistatic agents, metal deactivators, flame retardants, pigments, fluorescent brighteners and the like, so long as the additives do not adversely affect the basic characteristics of the composition.

In blending the polyolefin with the compounds (A), (B) and (C) to be used in the invention, the compound (D) optionally to be used, and other optional additives to be incorporated in case of necessity, any and every method which is suitable for forming a homogeneous blend can be employed. Thus, the starting materials may be blended simultaneously, they may be blended separately in plural stages, or they may be blended as a masterbatch of one or more components. These materials may be kneaded by any usual manner, for instance, by using a single-screw extruder, a double-screw extruder, or the like.

The polyolefin composition of the invention is useful in the field where the composition is processed at a high temperature for the purpose of raising the productivity and in the field of fibers, films and other shaped articles which are desired to be inhibited from discoloration, especially in the field of such shaped articles which are exposed to combustion gas or NOx gas. In particular, the composition is useful for fibers.

The composition can be shaped by various known methods. For example in case of films, such a method can be applied as forming the composition into films by means of any conventional film extruder, optionally with simultaneous stretching. In case of fibers, such a method can be applied as melt-spinning the composition by any conventional manner and optionally stretching the resulting products, or melt-spinning the composition and thereafter subjecting the resulting products to a surface treatment with a finishing agent comprising oil, an antistatic agent and others followed by stretching.

Next, the present invention will be explained in more detail with reference to examples, which are only for illustrative but not limitative of the scope of the invention. In the examples, given parts are by weight unless otherwise indicated.

Test additives used in the examples ar as follows, and they will be referred to hereinunder by the indicated letters.

A-1: 3,9-Bis[2-{3-(3-t-butyl-4-hydroxy-5-methylphenyl)propionyloxy}-1,1-dimethylethyl]-2,4,8,10-tetraoxaspiro[5.5]undecane AO2: 1,3,5-Tris(3,5-di-t-butyl-4-hydroxybenzyl) isocyanurate AO3: 1,3,5-Tris(4-t-butyl-3-hydroxy-2,6-dimethylbenzyl) isocyanurate AO4: Calcium bis(ethyl 3,5-di-t-butyl-4-hydroxybenzylphosphonate)

B-1: 2,4-Di-t-amyl-6-[1-(3,5-di-t-anyl-2-hydroxyphenyl)-ethyl]phenyl acrylate

B-2: 2-t-Butyl-6-(3-t-butyl-2-hydroxy-5-methylbenzyl)-4-methylphenyl acrylate

C-1: Bis(2,6-di-t-butyl-4-methylphenyl) pentaerythritol diphosphite

C-2: Bis(2,4-di-t-butylphenyl) pentaerythritol diphosphite

C-3: Tris(2,4-di-t-butylphenyl) phosphite

C-4: Tetrakis(2,4-di-t-butylphenyl) 4,4'-biphenylene diphosphonite

C-5: 2,2'-Ethylidenebis(4,6-di-t-butylphenyl) fluorophosphite

C-6: 2,2'-Methylenebis(4,6-di-t-butylphenyl) octyl phosphite

D-1: Polycondensate of dimethyl succinate with 1-(2-hydroxyethyl)-4-hydroxy-2,2,6,6-tetramethylpiperidine (TINUVIN 622 LD, produced by Ciba-Geigy Corp.)

HL2: Poly[{6-(1,1,3,3-tetramethylbutyl)imino-1,3,5-triazin-2,4-diyl}{(2,2,6,6-tetramethyl-4-piperidyl)imino}hexamethylene{(2,2,6,6-tetramethyl-4-piperidyl)imino}] (CHIMASSORB 944 LD, produced by Ciba-Geigy Corp.)

HL3: Poly[(6-morpholino-1,3,5-triazin-2,4-diyl){(2,2,6,6-tetramethyl-4-piperidyl)imino}hexamethylene{(2,2,6,6-tetramethyl-4-piperidyl)imino}] (CYASORB UV-3346, produced by American Cyanamid Co.)

EXAMPLE 1

| Formulation | |
|---|---|
| Unstabilized Polypropylene | 100 parts |
| Calcium Stearate | 0.05 part |
| Test Additives | Shown in Table 1 |

The above blend was admixed for 5 minutes in a mixer and thereafter extruded at 310° C. by using a 40 mmφ extruder to pelletize the blend. The resulting pellets were subjected to melt spinning at a temperature of 340° C. and under a resin discharge pressure of 100 kgf/cm³ (constant) by using a 30 mmφ extruder having a die shape of 0.5 mmφ ×36 holes, and the following characteristic items were evaluated.

(1) Heat Resistance

In the above melt spinning step, draw-off speed for the 36 filaments flowing out of the die was varied between 400 m/min. and 900 m/min. at an interval of 100 m/min., and the speed at which the filaments could be drawn without breakage was determined to evaluate the heat resistance. Since the filament breakage occurs due to the deterioration of the resin caused by the heat at the processing, no filament breakage or a higher speed capable of drawing out is excellent heat resistance at the processing.

(2) Thermal Oxidation Resistance

The unstretched filaments obtained by the melt spinning were stretched 2.5 times the length at 135° C. to obtain fibers of 18 denier/filament. The fibers were cut into 5 cm length, and about 3 g thereof was bundled at the center to make test specimen. The test specimen was put in a Geer oven of 135° C., and a period (days) until thermal discoloration occured was determined to evaluate the thermal oxidation resistance.

(3) Light Oxidation Resistance

Thirtysix fibers of the 18 denier/filament obtained in item (2) above were twisted to make yarn. The resulting yarn was put in a xenone fade meter having a black panel temperature of 89° C., and the tensile strength of the yarn was measured every time after 50 kJ of energy was irradiated. The light oxidation resistance was evaluated by the energy dose until the retention of the tensile strength reached 50%.

(4) Resistance to Discoloration by Combustion Gas

The same test specimen as in item (2) above was prepared, and it was exposed to combustion gas of 98° C. generated from a city gas for 30 minutes to evaluate the discoloration degree with visual judgement of the following five criteria, in which the smaller the value, the better the resistance to discoloration.

1: No discoloration
2: Slight discoloration
3: Moderate discoloration
4: Slightly large discoloration
5: Large discoloration The device utilized for the combustion gas exposure was a stainless steel cylinder having a diameter of 25 cm and a length of 70 cm, where the combustion gas was generated from the bottom and the test specimen was placed at the upper portion.

(5) Resistance to Discoloration by NOx Gas

The same test specimen as in item (2) above was prepared, and it was exposed to an atmosphere having an NOx concentration of 2% by volume for 24 hours in accordance with JIS L 0855 "Testing Method for Colour Fastness to Nitrogen Oxides". The discoloration degree was evaluated with the same visual judgement of the five criteria as described in item (4) above. The smaller the value, the better the resistance to discoloration.

The evaluation results of the above tests are shown in Table 1 and Table 2. In the tables, (1) to (5) appearing in the column of "Results" correspond to the characteristic items of the above evaluation tests and are as follows:

(1) Heat Resistance: A speed capable of drawing out (m/min.)

(2) Thermal Oxidation Resistance: Thermal discoloration period at 135° C. (days)
(3) Light Oxidation Resistance: Energy dose until the tensile strength is reduced by half
(4) Resistance to Discoloration by Combustion Gas
(5) Resistance to Discoloration by NOx Gas

TABLE 1

Runs of the Invention

| Run No. | Test Additives (kind and part) ||||  Results |||||
| | Phenolic Compound | Acrylate Compound | Phosphorous Compound | Piperidine Compound | (1) m/min. | (2) days | (3) kJ | (4) | (5) |
|---|---|---|---|---|---|---|---|---|---|
| 1 | A-1 0.1 | B-1 0.1 | C-1 0.1 | | 900 | 21 | 100 | 1 | 2 |
| 2 | A-1 0.1 | B-1 0.1 | C-2 0.1 | | 900 | 20 | 100 | 1 | 2 |
| 3 | A-1 0.1 | B-1 0.1 | C-3 0.1 | | 900 | 20 | 100 | 1 | 2 |
| 4 | A-1 0.1 | B-1 0.1 | C-4 0.1 | | 900 | 20 | 100 | 1 | 2 |
| 5 | A-1 0.1 | B-1 0.1 | C-5 0.1 | | 900 | 20 | 100 | 1 | 2 |
| 6 | A-1 0.1 | B-1 0.1 | C-6 0.1 | | 900 | 19 | 100 | 1 | 2 |
| 7 | A-1 0.2 | B-1 0.1 | C-1 0.1 | | 900 | 23 | 100 | 1 | 2 |
| 8 | A-1 0.1 | B-1 0.2 | C-1 0.1 | | 900 | 21 | 100 | 1 | 2 |
| 9 | A-1 0.1 | B-1 0.1 | C-1 0.2 | | 900 | 22 | 100 | 1 | 2 |
| 10 | A-1 0.1 | B-2 0.1 | C-1 0.1 | | 900 | 21 | 100 | 1 | 2 |
| 11 | A-1 0.1 | B-1 0.1 | C-1 0.1 | D-1 0.1 | 700 | 26 | 500 | 1 | 2 |
| 12 | A-1 0.1 | B-1 0.1 | C-2 0.1 | D-1 0.1 | 700 | 25 | 500 | 1 | 2 |
| 13 | A-1 0.1 | B-1 0.1 | C-3 0.1 | D-1 0.1 | 700 | 25 | 500 | 1 | 2 |
| 14 | A-1 0.1 | B-1 0.1 | C-4 0.1 | D-1 0.1 | 700 | 25 | 500 | 1 | 2 |
| 15 | A-1 0.1 | B-1 0.1 | C-5 0.1 | D-1 0.1 | 700 | 25 | 500 | 1 | 2 |
| 16 | A-1 0.1 | B-1 0.1 | C-6 0.1 | D-1 0.1 | 700 | 24 | 500 | 1 | 2 |

TABLE 2

Runs for Comparison

| Run No. | Test Additives (kind and part) |||| Results |||||
| | Phenolic Compound | Acrylate Compound | Phosphorous Compound | Piperidine Compound | (1) m/min. | (2) days | (3) kJ | (4) | (5) |
|---|---|---|---|---|---|---|---|---|---|
| 17 | AO2 0.1 | B-1 0.1 | C-1 0.1 | | 900 | 7 | 100 | 1 | 4 |
| 18 | AO3 0.1 | B-1 0.1 | C-1 0.1 | | 900 | 8 | 100 | 1 | 3 |
| 19 | AO4 0.1 | B-1 0.1 | C-1 0.1 | | 900 | 5 | 100 | 2 | 4 |
| 20 | AO2 0.1 | — | C-1 0.1 | | less than 400 | 6 | 100 | 1 | 4 |
| 21 | AO2 0.15 | — | C-1 0.15 | | less than 400 | 8 | 100 | 1 | 5 |
| 22 | AO3 0.1 | — | C-1 0.1 | | less than 400 | 7 | 100 | 1 | 3 |
| 23 | AO4 0.1 | — | C-1 0.1 | | less than 400 | 5 | 100 | 2 | 4 |
| 24 | A-1 0.1 | B-1 0.1 | — | | 900 | 14 | 100 | 1 | 2 |
| 25 | A-1 0.1 | B-2 0.1 | — | | 900 | 15 | 100 | 1 | 2 |
| 26 | A-1 0.1 | — | C-1 0.1 | | less than 400 | 16 | 100 | 1 | 2 |
| 27 | — | B-1 0.1 | C-1 0.1 | | 800 | 3 | 100 | 1 | 2 |
| 28 | A-1 0.1 | B-1 0.1 | C-1 0.1 | HL2 0.1 | 500 | 10 | 450 | 4 | 3 |
| 29 | A-1 0.1 | B-1 0.1 | C-1 0.1 | HL3 0.1 | 500 | 11 | 450 | 4 | 3 |
| 30 | A-1 0.1 | — | C-1 0.1 | D-1 0.1 | less than 400 | 19 | 300 | 1 | 2 |

The polyolefin composition blended with a particular hindered phenolic compound, a particular acrylate compound and a particular organic phosphorous compound, according to the present invention, has practically a sufficient stability against heat at the high temperature processing and against thermal oxidation at the usage, and also it exhibits higher resistance against discoloration caused by combustion gas or NOx gas. Additional incorporation of a particular hindered piperidine compound further improves the stability of the composition against light oxidation.

While the invention has been described in detail and with reference to specific embodiments and examples, it is to be understood for the person skilled in the art that the invention is not limited to the details given herein but may be modified and changed within the spirit and scope of the appended claims.

What is claimed is:
1. A polyolefin composition comprising a polyolefin and, per 100 parts by weight of the polyolefin, the following components:
(A) 0.01 to 1 part by weight of a hindered phenolic compound represented by the formula (I):

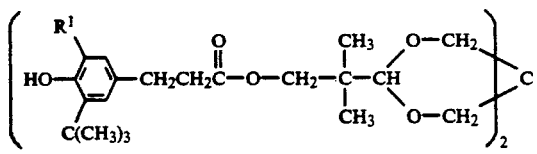

wherein $R^1$ is hydrogen or an alkyl of 1 to 3 carbon atoms;

(B) 0.01 to 1 part by weight of an acrylate compound represented by the formula (II):

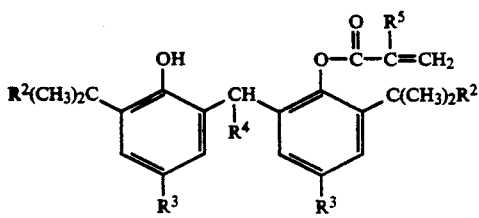

wherein $R^2$ is an alkyl of 1 to 5 carbon atoms, $R^3$ is an alkyl of 1 to 8 carbon atoms, $R^4$ is hydrogen or an alkyl of 1 to 8 carbon atoms, and $R^5$ is hydrogen or methyl; and (C) 0.01 to 1 part by weight of at least one organic phosphorous compound selected from the group consisting of
bis(2,6-di-t-butyl-4-methylphenyl) pentaerythritol diphosphite,
bis(2,4-di-t-butylphenyl) pentaerythritol diphosphite,
tris(2,4-di-t-butylphenyl) phosphite, tetrakis(2,4-di-t-butylphenyl) 4,4'-biphenylene diphosphonite,
2,2'-ethylidenebis(4,6-di-t-butylphenyl) fluorophosphite, and
2,2'-methylenebis(4,6-di-t-butylphenyl) octyl phosphite.

2. The polyolefin composition of claim 1, which further comprises:

(D) 0.01 to 1 part by weight, per 100 parts by weight of the polyolefin, of a hindered piperidine compound represented by the formula (III):

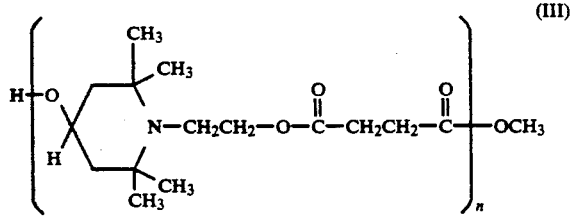

wherein n is 2 to 20.

3. The polyolefin composition of claim 1, wherein the polyolefin is a homopolymer of an α-olefin or a copolymer of two or more of the α-olefins.

4. The polyolefin composition of claim 3, wherein the polyolefin is polypropylene.

5. The polyolefin composition of claim 1, wherein the hindered phenolic compound (A) is represented by the formula (I) in which $R^1$ is an alkyl of 1 to 3 carbon atoms.

6. The polyolefin composition of claim 5, wherein the hindered phenolic compound (A) is 3,9-bis[2-{3-(3-t-butyl-4-hydroxy-5-methylphenyl)propionyloxy}-1,1'-dimethylethyl]-2,4,8,10-tetraoxaspiro[5.5]undecane.

7. The polyolefin composition of claim 1, wherein the acrylate compound (B) is represented by the formula (II) in which $R^2$ is methyl or ethyl, $R^3$ is methyl, t-butyl or t-pentyl, $R^4$ is hydrogen or methyl, and $R^5$ is hydrogen.

8. The polyolefin composition of claim 7, wherein the acrylate compound (B) is 2,4-di-t-amyl-6-[1-(3,5-di-t-amyl-2-hydroxyphenyl)ethylphenyl] acrylate or 2-t-butyl-6-(3-t-butyl-2-hydroxy-5-methylbenzyl)-4-methylphenyl acrylate.

9. The polyolefin composition of claim 1, wherein the organic phosphorous compound (C) is bis(2,6-di-t-butyl-4-methylphenyl) pentaerythritol diphosphite.

10. The polyolefin composition of claim 1, wherein the hindered phenolic compound (A) is present in an amount of from about 0.02 to about 0.5 part by weight, the acrylate compound (B) is present in an amount of from about 0.02 to about 0.5 part by weight, and the organic phosphorous compound (C) is present in an amount of from about 0.02 to about 0.5 part by weight, each per 100 parts by weight of the polyolefin.

11. The polyolefin composition of claim 2, wherein the hindered phenolic compound (A) is present in an amount of from about 0.02 to about 0.5 part by weight, the acrylate compound (B) is present in an amount of from about 0.02 to about 0.5 part by weight, the organic phosphorous compound (C) is present in an amount of from about 0.02 to about 0.5 part by weight, and the hindered piperidine compound (D) is present in an amount of from about 0.02 to about 0.5 part by weight, each per 100 parts by weight of the polyolefin.

12. A process for producing a polyolefin shaped article which comprises blending a polyolefin with:

(A) a hindered phenolic compound represented by the formula (I):

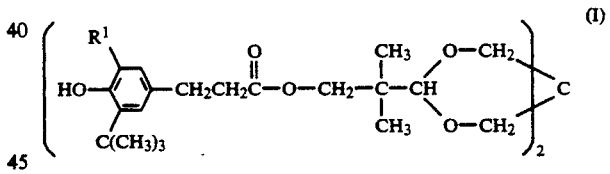

wherein $R^1$ is hydrogen or an alkyl of 1 to 3 carbon atoms;

(B) an acrylate compound represented by the formula (II):

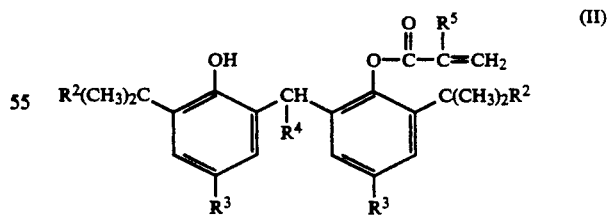

wherein $R^2$ is an alkyl of 1 to 5 carbon atoms, $R^3$ is an alkyl of 1 to 8 carbon atoms, $R^4$ is hydrogen or an alkyl of 1 to 8 carbon atoms, and $R^5$ is hydrogen or methyl; and (C) at least one organic phosphorous compound selected from the group consisting of
bis(2,6-di-t-butyl-4-methylphenyl) pentaerythritol diphosphite, bis(2,4-di-t-butylphenyl) pentaerythritol diphosphite, tris(2,4-di-t-butylphenyl) phosphite, tetrakis(2,4-di-t-butylphenyl) 4,4'-biphenylene diphosphonite, 2,2'-ethylidenebis(4,6-di-t-butylphenyl) fluorophosphite, and 2,2'-methylenebis(4,6-di-t-butylphenyl) octyl phosphite; and forming the resulting composition into a shaped article, whereby the shaped article is stabilized against heat and oxidation as well as against discoloration by combustion gas or nitrogen oxides gas.

13. The process of claim 12, wherein the polyolefin is further blended with (D) a hindered piperidine compound represented by the formula (III):

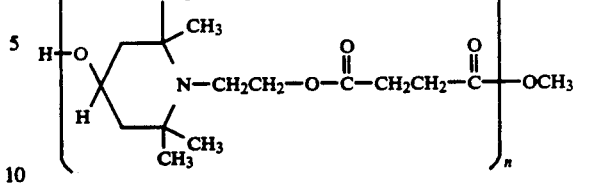

wherein n is 2 to 20, whereby the resulting shaped article is further stabilized against light.

14. The process of claim 12, wherein the forming is effected by melt-spinning the composition followed by stretching to prepare a fiber.

15. The process of claim 12, wherein the forming is effected by extruding the composition into a film.

16. A polyolefin fiber or film prepared from the composition of claim 1.

17. A polyolefin fiber or film prepared from the composition of claim 2.

* * * * *